United States Patent [19]
Reisinger

[11] Patent Number: 5,193,833
[45] Date of Patent: Mar. 16, 1993

[54] BICYCLE FRONT SUSPENSION, STEERING & BRAKING SYSTEM

[76] Inventor: Robert Reisinger, 472-B Islay St., San Luis Obispo, Calif. 93401

[21] Appl. No.: 572,719

[22] Filed: Aug. 24, 1990

[51] Int. Cl.[5] .................. B62K 25/04; B60T 11/16; F16D 65/20
[52] U.S. Cl. .................. 280/276; 188/20; 188/72.4; 188/72.9; 188/344; 267/141.1; 280/277
[58] Field of Search ........... 280/276, 277, 275, 279, 280/280; 188/20, 72.4, 72.9, 344; 267/141.1

[56] References Cited

U.S. PATENT DOCUMENTS

| | | | |
|---|---|---|---|
| 2,683,034 | 7/1954 | Seddon | 280/276 |
| 2,683,044 | 7/1954 | Seddon | 280/276 |
| 4,756,612 | 7/1988 | Toms, Jr. | 267/141.1 |

FOREIGN PATENT DOCUMENTS

| | | | |
|---|---|---|---|
| 3242830 | 5/1984 | Fed. Rep. of Germany | 280/277 |
| 147555 | 11/1954 | Sweden | 280/276 |
| 2026635 | 2/1980 | United Kingdom | 188/72.4 |

Primary Examiner—Mitchell J. Hill
Attorney, Agent, or Firm—Wallace, Robert M.

[57] ABSTRACT

The invention is a bicycle front assembly in which suspension is provided by a pair of telescoping tubes having a plurality of elastic cells of different stiffnesses in their hollow interior. Steering geometry adjustment is provided by connecting the bottom end of one of the tubes to the front wheel axle by a drop-out which horizontally offsets the tube from the axle. Retrofitable hydraulic front wheel disk brakes are provided by a closed system hydraulic brake caliper assembly mounted to the front wheel axle and connected to a conventional brake cable of a handbrake. Automatic self-centering of the disk is provided by a web mounted on the front wheel axle having horizontal fingers nested in holes in the disk along which the disk is allowed to slide in response to a centering force from the calipers.

13 Claims, 4 Drawing Sheets

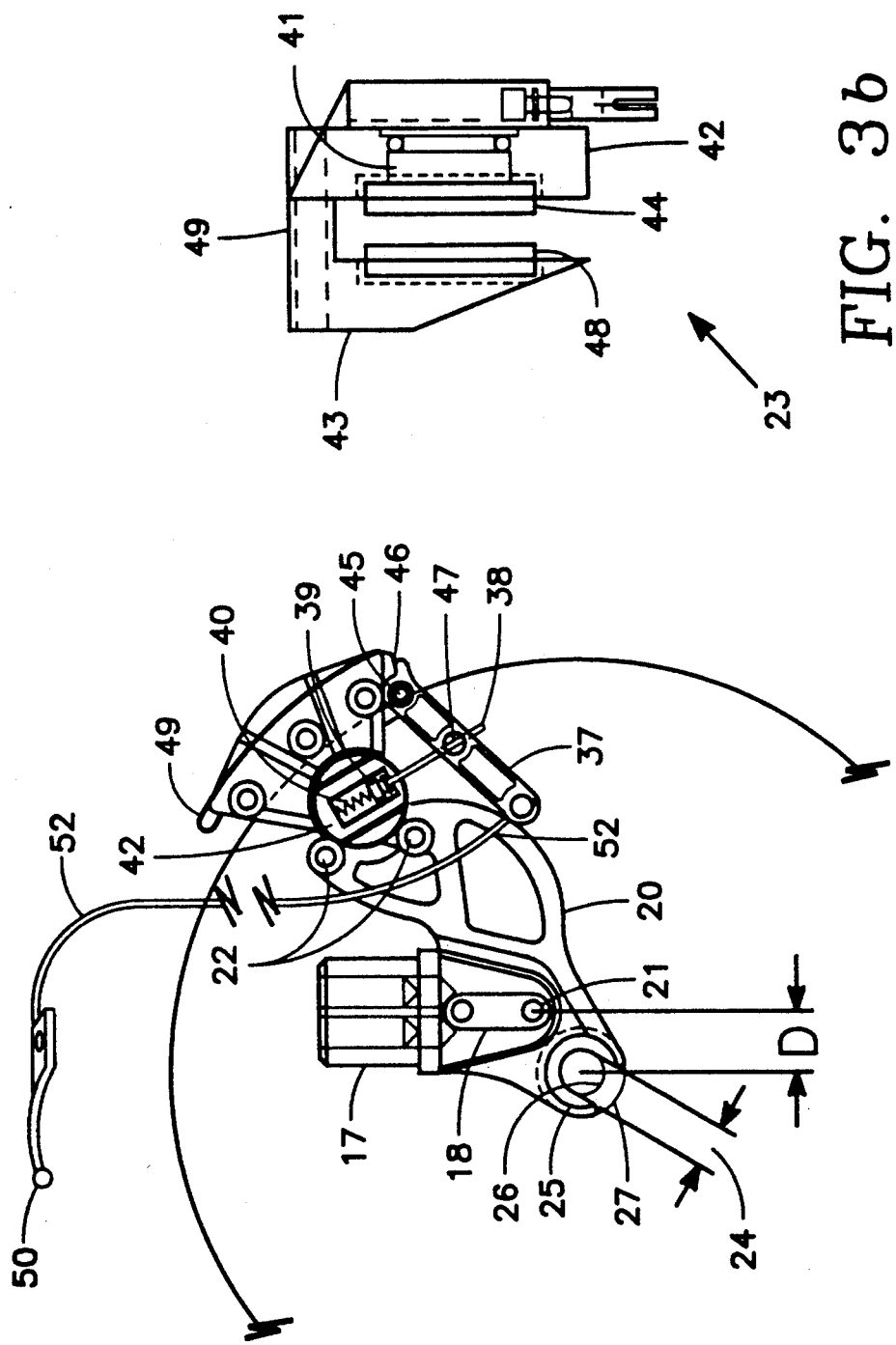

BICYCLE FRONT SUSPENSION, STEERING & BRAKING SYSTEM

BACKGROUND OF THE INVENTION

The recent increased popularity of off-road or "Mountain" bicycling has promoted the need for technical innovation throughout the bicycle industry. The front suspension, adjustable steering geometry and mechanically-actuated hydraulic disc brake system I have designed will greatly enhance the handling characteristics of bicycles used in this rigorous application while improving rider comfort and minimizing rider fatigue.

On a standard bicycle the front wheel is secured to the frame via its axle by two metal tubes or "forks". These forks join some distance above the wheel and attach to a single tube which is held in bearings at the top and bottom of the steer-head of the frame. This configuration results in a stable, steerable front-end but also provides a direct mechanical path between the wheel rim and the handlebars for shocks and vibrations to be transferred through. The only isolation a rider has from the terrain comes from the resiliency of the tire and a very slight amount of deflection in the forks.

As the terrain becomes progressively harsh two major detrimental effects occur: 1) The rider's body is forced to absorb the brunt of the shocks which can quickly lead to extensive fatigue and, 2) The front wheel of the bicycle spends far less time in direct contact with the ground, thus greatly diminishing the riders ability to control the vehicle.

It is apparent that the combination of these effects alone can easily result in an uncomfortable and potentially hazardous bicycling experience, however, this scenario is further aggravated by the addition of hills. While traveling down a hill of any appreciable grade, hard and often continuous braking is required to avoid excessive speeds. While braking the rider must hold himself against the handlebars to avoid being thrown forward. To apply this necessary force the rider's arms and upper body become more rigid and, as such, less able to absorb shocks. Additionally, the rider is forced to partially remove his grip on the bars to actuate the brakes thereby further diminishing his ability to control the front-end of the bicycle while increasing arm fatigue. Obviously, under these conditions any substantial surface imperfection encountered (i.e. bump, rock, water-rut, tree root, etc.) could quickly lead to a catastrophic separation of the rider from the vehicle.

It is for the avoidance of these common, uncomfortable and too often dangerous off-road bicycling scenarios that I have designed a front-end suspension system incorporating continuous acting shock absorption, adjustable damping and variable geometry so that the system may be tailored to individual preference and application as well as an easily retrofitable, mechanically actuated, hydraulic disc brake to increase braking power while decreasing required actuation pressure.

While suspension systems for bicycles which partially address the aforementioned difficulties are already in existence, the following detailed description of my system should provide an adequate understanding of its aspects which are unique in design and application.

SUMMARY OF THE INVENTION

The fork assembly consists of a pair of concentric cylindrical telescoping tubes with the larger diameter tubes held stationary in a clamp which mounts to a standard bicycle steer tube to provide the interface with the frame. The smaller diameter tubes run inside the larger tubes and attach, via a removable front axle mount, to the front wheel. This configuration permits the strongest (largest diameter) tube to be located at the point of greatest stress. The concentric tubes are filled with cylindrical elastomer cells of various composition and compressibility so that as the internal concentric tube slides into the external tube (as when the bicycle hits a bump) the fork becomes increasingly stiff as the softer elastomer cells compress first and the stiffer elastomer are compressed later. The use of separate cells facilitates a wide variation of shock absorption characteristics through changing the ratio of softer to stiff cells.

The removable front axle mount, or "drop-out", referred to above is designed so that replacements having slightly different geometry can be easily exchanged. These adjustments allow the steering geometry (horizontal displacement between the front end and the front wheel axle) to be custom configured to individual rider requirements and taste.

The disc brake on the front wheel is a cable actuated, closed hydraulic system in which fluid flow through the cylinder orifice always causes brake-pad movement (unlike conventional automotive braking systems which use a reservoir and valving that effects the movements of the drive piston). The system does not require replacement of the typical hand brake/cable assembly mounted to the handle bars because the entire hydraulic disc piston control is contained within the brake caliper mounted near the front axle. In contrast, motorcycle disc brakes require a hydraulic line between the handle bar and the caliper near the wheel axle.

The disc floats axially (while remaining parallel to the plane of the front wheel) in a special web so as to be automatically centered by the calipers as the brake pads wear. The special web is fixed to the front wheel and includes a set of cylindrical axial studs arranged in a circle for interface with the disc. The studs nest in recesses in the inner radius of the annular disc and serve to transfer the braking forces to the front wheel.

BRIEF DESCRIPTION OF THE DRAWINGS

FIG. 3a is a side view of another embodiment of the invention.

FIG. 3b is a top view of a caliper assembly in the embodiment of FIG. 3a.

FIG. 4b is an exploded end view corresponding to FIG. 4a.

FIG. 5 is a front view of the embodiment of FIG. 1.

DETAILED DESCRIPTION OF THE INVENTION

Figure 1:
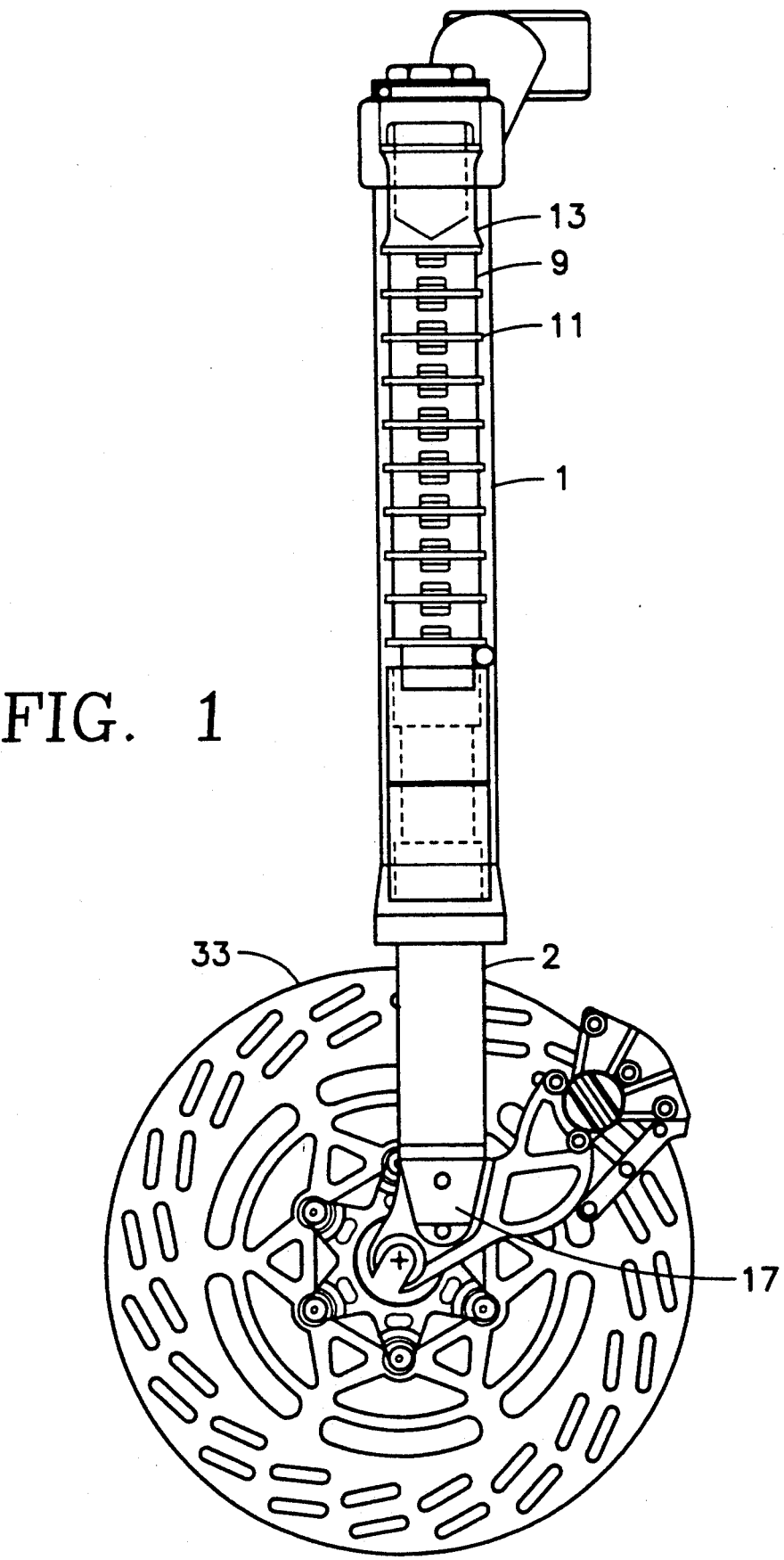
FIG. 1 is a side view of one embodiment of the invention.
Figure 2:
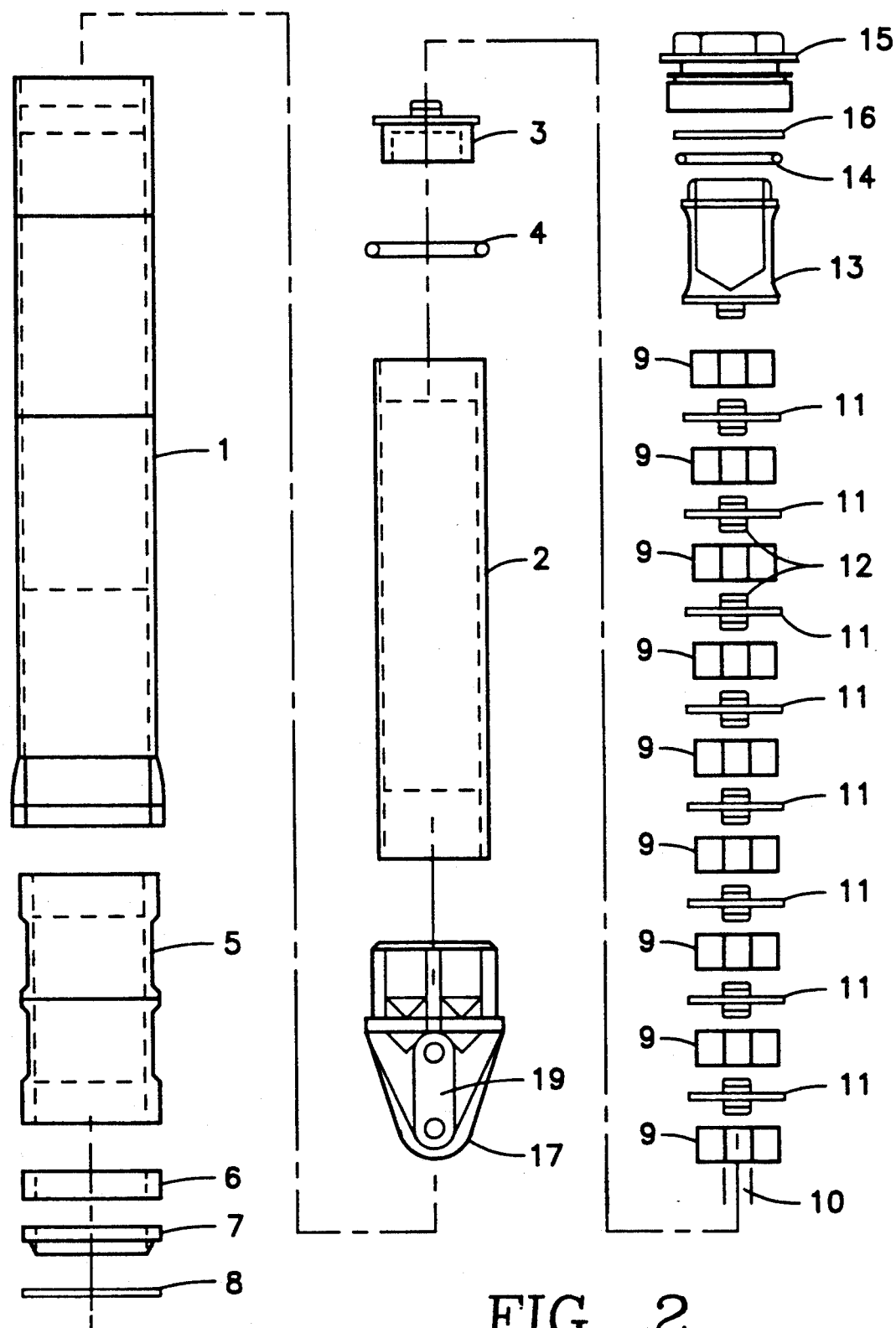
FIG. 2 is an exploded view of the embodiment of FIG. 1.

Referring to FIGS. 1, 2 and 5, the smaller diameter, internal telescopic fork tube 2 is supported for linear motion parallel to its longitudinal axis in the bearing cartridge 5. The bearing cartridge 5 is retained inside the larger diameter, stationary fork tube 1 along with a seal 6 and rod-wipe 7 by a snap ring 8. The slider cap 3 attaches to the top of the internal fork tube 2 and limits the extension of the internal fork tube 2 by compressing the top-out O-ring 4 against the top of the bearing cartridge 5.

Inside the stationary fork tube 1, positioned on top of the slider cap 3, sits the first cylindrical elastomeric cell 9 of the composite stack of elastomeric cells 9 and round stacking washers 11. The stacking washers 11 have smaller diameter protrusions 12 which fit into the internal diameter 10 of the elastomeric cells 9. The stacking washers 11 serve a multiple purpose. They position the elastomer cells 9 in the center of the tube by virtue of their outer diameter being only slightly less than the external fork tube's 1 internal diameter, they provide a stable plane for each individual elastomer cell 9 to deform against and, as the elastomer cells 9 collapse further, the protrusions 12 on the top and bottom of each stacking spacer 11 come in contact to form a solid mechanical connection between the slider cap 3 and the preload spacer 13. The preload spacer 13 then pushes against the bottom-out O-ring 14 compressing it against the fork cap 15 resulting in the ultimate limit of travel for the internal telescopic fork tube 2.

This configuration of elastomer cells 9 separated by stacking washers 11 allows for easy adjustment of the fork assemblies compressive and rebound characteristics through the exchange of the elastomer cells 9 with cells having greater or lesser stiffness. Further adjustment of the compression damping of the fork assembly is attained by the insertion of preload washers 16 of various thicknesses between the bottom out O-ring 14 and the preload spacer 13.

Referring to FIG. 3a, the attachment between the bottom of the internal telescopic fork tube 2 and the front axle mounting plate or "drop-out" 20 is made via the slider lug 17 which is secured into the end of the internal fork tube 2. A nested mechanical interface between the slider lug 17 and the drop-out 20 is created by an island 18 on the drop-out 20 and a matching nest 19 on the slider lug 17. The interface is held together by the two drop-out mounting screws 21 and provides a solid, non-rotatable connection between the slider lug 17 and the drop-out 20.

The left drop-out 20 extends upward and aft of the slider lug 17/drop-out 20 connection to provide the mounting location for the brake caliper 23 which is held in place on the drop-out 20 by the two caliper mount bolts 22. Connection of the drop-out 20 to the wheel axle 26 is made via the axle slot 24 located forward and below the slider lug 17/drop-out 20 connection. The axle washer nest 25 provides positive location of the axle 26 in the drop-out 20. The horizontal distance, D, between the centerline of the slider lug 17 and the center of the axle washer nest 25 and axle slot 24 can be adjusted by using different drop-outs 20 in order to vary the steering geometry and consequent handling characteristics of the bicycle.

Figure 4B:
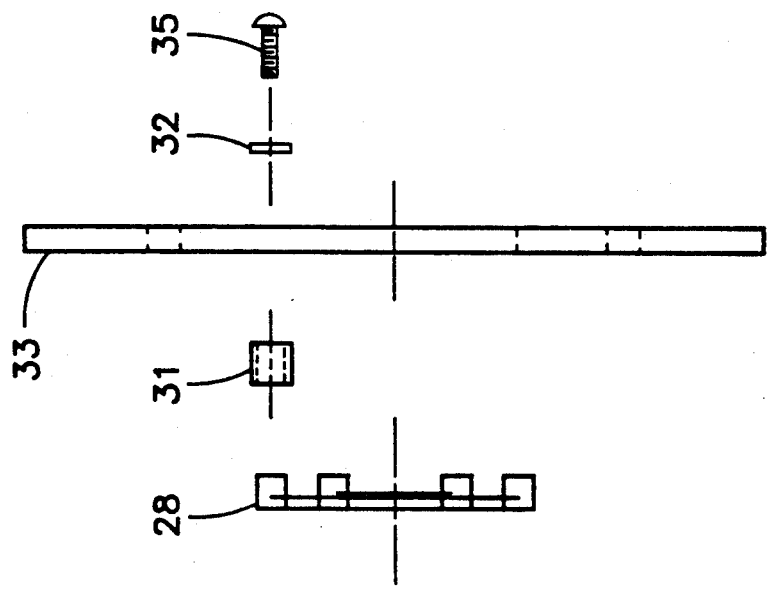
Figure 4A:
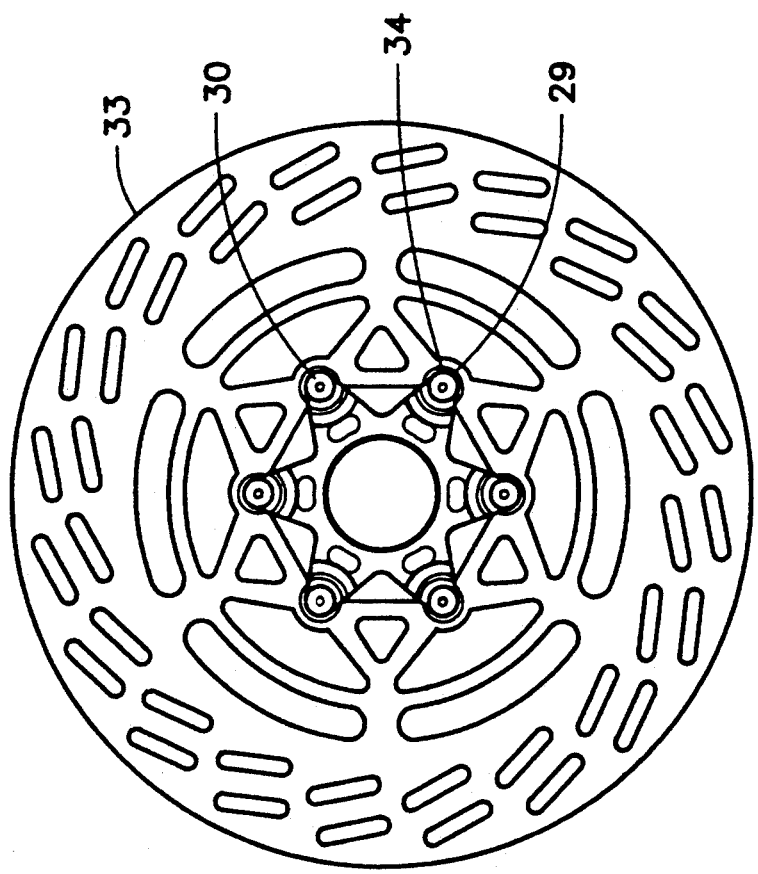
FIG. 4a is a side view of yet another embodiment of the invention.

The necessary distance between the drop-out 20 and the disc web 28 is maintained by the left axle spacer 27. As shown in FIGS. 4a and 4b, the disc web 28 is secured in the plane of the brake disc 33, perpendicular to the centerline of the axle 26, to the wheel hub at the brake disc mounting holes 34. The disc web 28 consists of a set of radial arms 29 extending outward and culminating in the solid cylindrical web studs 30 which project off the radial arms 29 perpendicular to the plane of the disc. The web spacers 31 fit over the web studs 30 and interface directly with the brake disc mounting holes 34 in the brake disc 33. The brake disc 33 is retained from falling off the web assembly during wheel removal by thin disc retaining washers 32, having an outside diameter slightly larger than that of the disc mounting holes 34, and the disc retaining bolts 35.

This web configuration allows the brake disc 33 to move axially, perpendicular to the plane of rotation as the brake pads 36 wear while providing direct mechanical transference of the braking forces from the brake disc 33 through the mounting holes 34 through the web spacer 31 to the web stud 30 and finally to the web arm 29. Additionally, the braking forces are distributed evenly among each of the web arms 29 and the disc/web interface damping can be altered by changing the material used for the web spacers 31.

Referring to both FIGS. 3a and FIG. 3b, the cable operated hydraulic caliper assembly 23 is a self-contained, closed system consisting of the piston actuator lever 37, the actuator adjustment screw 38, the small diameter internal piston 39, the internal piston return spring 40, the large diameter drive piston 41, the caliper body 42, the caliper back 43 and the two brake pads 44 and 48. The actuator lever 37 pivots at the lever pivot 45. This pivot is designed to also provide a positive stop 46 for the actuator lever 37 so the actuator adjustment screw 38, which connects to the actuator lever 37 via the adjustment pivot 47 mounted in its center, can provide pressure against the internal piston 39 to facilitate brake adjustment.

To operate the brake the rider squeezes the handlebar mounted brake lever 50 (standard bicycle hardware) which causes the brake cable 52 to pull up on the left end of the actuator lever 37. As the lever rotates about the lever pivot 45 the actuator adjustment screw 38 pushes the internal piston 39 along its bore, increasing the oil pressure to push against the drive piston 41 which in turn pushes the movable brake pad 44 squeezing the brake disc 33 against the stationary brake pad 48 and resulting in the braking action. When the rider releases the brake lever the internal piston return spring 40 pushes the internal piston 39 back to its original position thereby lowering the fluid pressure against the drive piston 41 slightly below atmospheric pressure allowing it to draw back following the oil level.

As the brake pads 44 and 48 wear, the adjustment screw 38 provides for repositioning of the internal piston 39 and drive piston 41 to compensate. Additional adjustment can be provided by including a removable caliper shim 49 between the caliper body 42 and the caliper back 43 when the brake pads 44 and 48 are new. As the external adjustment is used up, that is when the drive piston is fully extended but inadequate braking exists, the caliper shim 49 can be removed and the adjustment readjusted, additional pad wear equal to the thickness of the caliper shim 49 will be available.

Wherefore, having thus described the invention, what is claimed is:

1. A bicycle front wheel assembly supporting a rotatable steer head of a bicycle frame with respect to a bicycle front wheel axle, said assembly comprising:

a pair of telescoping hollow tubes connected between said rotatable steer head and said front wheel axle;

a plurality of elastically compressible cells of different stiffness compressibly nested inside said hollow tubes, whereby to increase the force required to telescope said tubes together in stages corresponding to the different stiffnesses of said compressible cells; and a plurality of solid disks between adjacent ones of said compressible cells, each of said disks having a top surface perpendicular to its rotational axis and a protrusion extending along said axis out from said top surface, whereby the protrusions of all of said disks limit ultimate compression of said compressible cells.

2. A bicycle front wheel assembly of claim 1 further comprising a removable modular drop-out connecting a bottom end of one of said pair of telescoping tubes to said front wheel axle, said drop-out extending laterally with respect to said telescoping tubes whereby said bottom tube end is laterally displaced with respect to said front wheel axle, whereby to set certain bicycle steering geometry parameters in accordance with the length by which said drop-out extends laterally.

3. The bicycle front wheel assembly of claim 1 wherein a brake disk is attached to said front wheel axle for co-rotation therewith, said front wheel assembly supporting bicycle handle bars having a hand brake thereon with a brake cable movable by said hand brake, said bicycle front wheel assembly further comprising:
   caliper means for grasping said disk,
   a closed hydraulic system supported on said front wheel axle and comprising a pair of pistons of different surface areas which move a fluid media in a confined sealed volume, the piston with the large surface area connected to said caliper means,
   lever means for leveragingly coupling the piston with the smaller surface area to said brake cable.

4. The bicycle front wheel assembly of claim 1 further comprising:
   a planar web attached to said front wheel axle for co-rotation therewith whereby the plane of said web is held parallel to the plane of rotation of said front wheel axle;
   a set of finger members extending out from said web in a direction at least approximately perpendicular to said web plane and being supported by said web; and
   a planar brake disk having opening means for movably nesting respective ones of said finger members therein, said rake disk lying in a plane at least approximately parallel to the plane of said web, said disk having a thickness at least in the vicinity of each of said means for nesting whereby said means for nesting may slide with respect to said finger members whereby said disk is free to move in the direction of said finger members in response to an applied force.

5. The bicycle front wheel assembly of claim 4 further comprising a pair of brake calipers which can grasp opposite faces of said disk simultaneously, whereby said disk is self-centering with respect to said brake calipers.

6. The bicycle front wheel assembly of claim 4 further comprising means for limiting the distance along which each of said means for nesting may travel along said finger members, whereby to prevent said disk from sliding off of said finger members.

7. The bicycle front wheel assembly of claim 1 wherein said pair of telescoping tubes are disposed on one side of said front wheel assembly, said front wheel assembly further comprising:
   a second pair of telescoping hollow tubes disposed on the opposite side of said front wheel assembly and connected between said rotatable steer head and said front wheel axle;
   a second plurality of elastically compressible cells of different stiffnesses compressibly nested inside said second pair of hollow tubes, whereby to increase the force required to telescope said second pair of tubes together in stages corresponding to the different stiffnesses of said compressible cells; and
   a plurality of solid disks between adjacent ones of said second plurality of compressible cells, each of said disks having a top surface perpendicular to its rotational axis and a protrusion extending along said axis out from said top surface, whereby the protrusions of all of said disks limit ultimate compression of said compressible cells.

8. A bicycle front wheel assembly supporting a rotatable steer head of a bicycle frame with respect to a bicycle front wheel axle, said assembly comprising:
   a planar web attached to said front wheel axle for co-rotation therewith whereby a plane of said web is held parallel to a plane of rotation of said front wheel axle;
   a set of finger members extending out from said web in a direction at least approximately perpendicular to said plane of said web and being supported by said web; and
   a planar brake disk having opening means for movably nesting respective ones of said finger members therein, said brake disk lying in a plane at least approximately parallel to the plane of said web, said disk having a thickness at least in the vicinity of each of said means for nesting whereby said means for nesting may slide with respect to said finger members whereby said disk is free to move in the direction of said finger members in response to an applied force.

9. The bicycle front wheel assembly of claim 8 further comprising a pair of brake calipers which can grasp opposite faces of said disk simultaneously, whereby said disk is self-centering with respect to said brake calipers.

10. The bicycle front wheel assembly of claim 8 further comprising means for limiting the distance along which each of said means for nesting may travel along said finger members, whereby to prevent said disk from sliding off of said finger members.

11. A bicycle front wheel assembly supporting a rotatable steer head of a bicycle frame with respect to a bicycle front wheel axle, wherein a brake disk is attached to said front wheel axle for co-rotation therewith, said front wheel assembly supporting bicycle handle bars having a hand brake thereon with a brake cable movable by said hand brake, said bicycle front wheel assembly further comprising:
   caliper means for grasping said disk,
   a closed hydraulic system mounted on said front wheel axle and comprising a pair of pistons of different surface areas which move a fluid media in a confined sealed volume, the piston with the large surface area connected to said caliper means,
   lever means for leveragingly coupling the piston with the smaller surface area to said brake cable,
   a planar web attached to said front wheel axle for co-rotation therewith whereby a plane of said web is held parallel to a plane of rotation of said front wheel axle;
   a set of finger member extending out from said web in a direction at least approximately perpendicular to said plane of said web and being supported by said web; and said brake disk being planar and having opening means for movably nesting respective ones of said finger members therein, said brake disk lying in a plane at least approximately parallel to the plane of said web, said disk having a thickness at least in the vicinity of each of said means for nesting whereby said means for nesting may slide with respect to said finger members whereby said disk is free to move in the direction of said finger members in response to an applied force.

12. The bicycle front wheel assembly of claim 11 wherein said caliper means grasp opposite faces of said disk simultaneously, whereby said disk is self-centering with respect to said brake calipers.

13. The bicycle front wheel assembly of claim 11, further comprising means for limiting the distance along which each of said means for nesting may travel along said finger members, whereby to prevent said disk from sliding off of said finger members.

* * * * *